United States Patent
Prissok et al.

(10) Patent No.: US 9,562,131 B2
(45) Date of Patent: Feb. 7, 2017

(54) THERMOFORMABLE RIGID POLYURETHANE-POLYAMIDE FOAM

(71) Applicant: BASF SE, Ludwigshafen (DE)

(72) Inventors: Frank Prissok, Lemfoerde (DE); Julio Albuerne, Lemfoerde (DE); Christian Renner, Untersiggenthal (CH)

(73) Assignee: BASF SE, Ludwigshafen (DE)

( * ) Notice: Subject to any disclaimer, the term of this patent is extended or adjusted under 35 U.S.C. 154(b) by 455 days.

(21) Appl. No.: 13/969,837

(22) Filed: Aug. 19, 2013

(65) Prior Publication Data
US 2014/0058005 A1    Feb. 27, 2014

Related U.S. Application Data

(60) Provisional application No. 61/691,274, filed on Aug. 21, 2012.

(51) Int. Cl.
| | |
|---|---|
| *C08G 18/18* | (2006.01) |
| *C08G 18/20* | (2006.01) |
| *C08G 18/32* | (2006.01) |
| *C08G 18/34* | (2006.01) |
| *C08G 101/00* | (2006.01) |

(52) U.S. Cl.
CPC ....... *C08G 18/1825* (2013.01); *C08G 18/1833* (2013.01); *C08G 18/1858* (2013.01); *C08G 18/2027* (2013.01); *C08G 18/3206* (2013.01); *C08G 18/341* (2013.01); *C08G 2101/005* (2013.01); *C08G 2101/0025* (2013.01)

(58) Field of Classification Search
CPC ............ C08G 18/1825; C08G 18/1833; C08G 18/1858; C08G 18/2027; C08G 18/3206; C08G 18/341; C08G 2101/0025; C08G 2101/005
See application file for complete search history.

(56) References Cited

U.S. PATENT DOCUMENTS

| | | | |
|---|---|---|---|
| 4,382,042 A | 5/1983 | Hardy et al. | |
| 5,219,893 A * | 6/1993 | Konig | B60R 13/0225 264/241 |
| 6,066,681 A * | 5/2000 | Kaplan | C08G 18/34 521/125 |
| 2006/0030633 A1* | 2/2006 | Keske | C08G 18/089 521/99 |
| 2006/0142407 A1* | 6/2006 | Hollmann | C08G 18/1825 521/172 |
| 2009/0099272 A1* | 4/2009 | Williams | C08G 18/089 521/85 |

FOREIGN PATENT DOCUMENTS

| | | |
|---|---|---|
| DE | 42 02 758 A 1 | 8/1993 |
| DE | 43 33 795 A 1 | 4/1995 |
| DE | 10 2004 062 540 A1 | 7/2006 |
| EP | 0 423 594 A2 | 4/1991 |
| EP | 0 437 787 A1 | 7/1991 |
| EP | 0 629 607 A2 | 12/1994 |
| EP | 1 984 438 | 10/2008 |
| EP | 2 247 636 | 11/2010 |
| EP | 2 612 876 A1 | 7/2013 |
| WO | WO 2007/090755 A1 | 8/2007 |
| WO | WO 2009/103764 A1 | 8/2009 |

\* cited by examiner

*Primary Examiner* — John Cooney
(74) *Attorney, Agent, or Firm* — Oblon, McClelland, Maier & Neustadt, L.L.P.

(57) ABSTRACT

The present invention relates to a process for producing a thermoformable rigid polyurethane-polyamide foam having a closed-cell content of less than 70%, which comprises mixing (a) an organic polyisocyanate with (b) one or more polymeric compounds having two or more isocyanate-reactive hydrogen atoms, (c) optionally crosslinking and/or chain-extending agents, (d) one or more carboxylic acids having a functionality of 2 or more, (e) a catalyst comprising a Lewis base component, and (f) optionally auxiliaries and additives to form a reaction mixture and reacting this reaction mixture to form the rigid polyurethane-polyamide foam. The present invention further relates to a thermoformable rigid polyurethane-polyamide foam obtained by such a process and also to the use of such a thermoformable rigid polyurethane-polyamide foam for interior lining or engine compartment lining of motor vehicles.

18 Claims, No Drawings

THERMOFORMABLE RIGID POLYURETHANE-POLYAMIDE FOAM

The present invention relates to a process for producing a thermoformable rigid polyurethane-polyamide foam having a closed-cell content of less than 70%, which comprises mixing (a) an organic polyisocyanate with (b) one or more polymeric compounds having two or more isocyanate-reactive hydrogen atoms, (c) optionally crosslinking and/or chain-extending agents, (d) one or more carboxylic acids having a functionality of 2 or more, (e) a catalyst comprising a Lewis base component, and (f) optionally auxiliaries and additives to form a reaction mixture and reacting this reaction mixture to form the rigid polyurethane-polyamide foam. The present invention further relates to a thermoformable rigid polyurethane-polyamide foam obtained by such a process and also to the use of such a thermoformable rigid polyurethane-polyamide foam for interior lining or engine compartment lining of motor vehicles.

Thermoformable rigid polyurethane foams, hereinafter also referred to as "TF foams", and their use as interior lining in motor vehicles are known and described for example in "Kunststoffhandbuch, Band 7, Polyurethane", Carl Hanser Verlag, 3rd edition 1993, chapter 6.5.4.1.

Foams comprising amide as well as urethane groups are also known. EP 423594 describes a process for producing polyurethane foams which utilizes salts of an organic carboxylic acid or polycarboxylic acid with specific organic bases. The molded articles obtained have a density of not less than 250 g/mol, since the COOH—NCO reaction generally proceeds relatively slowly.

This problem of the sluggish COOH—NCO reaction is circumvented in DE 4202758 by using polyhydroxy carboxylic acids instead of monobasic or polybasic carboxylic acids, these polyhydroxy carboxylic acids preferably having two OH groups which react with isocyanates to form a polyurethane scaffold before the carboxyl group reacts with the isocyanate. N-Methylimidazole is also used as catalyst in one example.

Thermoformable rigid polyurethane foams installed in the automotive interior, usually as lining components in the roof region which are known as roof liners, have to meet manifold requirements. They have to have a certain level of stiffness while they must not evolve any troublesome emissions, malodorants for example. The acoustical function of the roof liner is particularly important. More particularly, it has to reduce the airborne sound. The properties of the thermoformable rigid polyurethane foams used in the roof liner have a decisive bearing on the quality of these roof-liner properties. Rigid polyurethane foams having a very high permeability to air are desirable for good airborne-sound absorption. The currently known thermoformable rigid polyurethane foams fail to meet these requirements in full.

The sound-damping performance of a thermoformable rigid polyurethane foam/roof liner is very largely dependent on the air permeability thereof. Roof liners made of rigid polyurethane foams having an improved air permeability are observed to provide better damping of airborne sound. Improved air permeability and hence also improved sound damping can be achieved by "needling" the thermoformable rigid polyurethane foams/roof liners. Needles are punched into the ready-produced foam/roof liner, which has an adverse effect on the mechanical stability of the foam as well as improving the air permeability of the foam/roof liner and hence also the sound-damping performance. Another disadvantage of this method is that a further operation is needed to produce the sound-absorbing rigid polyurethane foams.

The use of complex mixtures of polyols to open the cells in the foam is another way to improve air permeability. Polyol mixtures of this type are described in EP 437787, DE 4333795, DE 102004062540 and EP 2247636.

It is an object of the present invention to provide a process for producing thermoformable rigid polyurethane-polyamide foams which is simple to carry out and leads to a thermoformable rigid polyurethane-polyamide foam having good mechanical properties, such as high stiffness and low brittleness, as well as high air permeability. The present invention has more particularly for its object to provide a process of this type which needs only one polyol, and to reduce the amount of water needed for the foaming reaction.

We have found that this object is achieved by a process for producing a thermoformable rigid polyurethane-polyamide foam having a closed-cell content of less than 70% according to claim 1. These input materials (a) to (f) can each herein be used as individual materials or in admixture with further compounds of components (a) to (f).

The present invention further provides a thermoformable rigid polyurethane-polyamide foam obtained by such a process and also for the use of such a thermoformable rigid polyurethane-polyamide foam for interior lining or engine compartment lining of motor vehicles.

Mold temperatures for thermoforming the thermoformable rigid polyurethane-polyamide foams of the present invention are preferably in the range from 70 to 160° C., more preferably in the range from 80 to 150° C. and most preferably in the range from 85 to 140° C.

Polyurethane-polyamide foams in the context of the present invention are foams as defined in German standard specification DIN 7726. Density for the rigid polyurethane-polyamide foams of the present invention is in effect in the range from 5 to 80 g/L, more preferably in the range from 10 to 50 g/L and most preferably in the range from 15 to 35 g/L. Compressive stress at 10% compression for the rigid polyurethane-polyamide foams of the present invention is not less than 80 kPa, preferably not less than 150 kPa and more preferably not less than 180 kPa. The DIN ISO 4590 closed-cell content of the rigid polyurethane-polyamide foam according to the present invention is typically below 70%, preferably below 50%, more preferably below 20% and most preferably below 10%. There are open as well as closed cells, meaning that the open-cell content is 30% when the closed-cell content is 70%. Thermoformable rigid polyurethane foams and their use as interior lining in motor vehicles are known and described for example in "Kunststoffhandbuch, Band 7, Polyurethane", Carl Hanser Verlag, 3rd edition 1993, chapter 6.5.4.1., or in WO 2009203764.

Organic polyisocyanates a) are preferably used in the form of the industrially readily available aromatic polyisocyanates, more preferably mixtures of diphenylmethane diisocyanates (MDI) and polyphenylpolymethylene polyisocyanates, so-called crude MDI, advantageously with a monomeric MDI content of 30 to 65 wt %, more preferably of 35 to 60 wt % and most preferably of 35 to 55 wt %.

Polyisocyanates a) can be used in the form of polyisocyanate prepolymers. These polyisocyanate prepolymers are obtainable by reacting polyisocyanates as described above (constituent (a-1)) in excess, for example at temperatures of 30 to 100° C. and preferably at about 80° C., with polyols (constituent (a-2)), to form the prepolymer. It is preferable to use the polyols described hereinbelow under b) for this. Chain-extending agents (a-3) can optionally also be added to the reaction to form the polyisocyanate prepolymer. Chain extenders as described hereinbelow under c) can all be used as chain-extending agents (a-3). The ratio of organic polyisocyanates (a-1) to polyols (a-2) and chain extenders (a-3) is preferably chosen such that the isocyanate prepolymer has an NCO content of 10 to 30% and more preferably of 18 to 29%.

Organic polyisocyanate a) is also useful in the form of crude-MDI modifications comprising isocyanurate, biuret, carbodiimide and/or preferably urethane groups. Also, it can be advantageous for particular fields of application for the crude MDI to have added to it minor amounts, for example no more than 10 wt %, of tolylene diisocyanate isomer mixtures and/or 4,4'- and/or 2,4'-MDI optionally modified with biuret, carbodiimide and/or urethane groups.

Polymeric compounds having two or more isocyanate-reactive hydrogen atoms (b) can be used in the form of any known polyurethane-forming compound having two or more reactive hydrogen atoms and a number-average molecular weight of not less than 300 g/mol. Compounds of this type have a functionality of 2 to 8 and a number-average molecular weight of 300 to 12 000 g/mol for example. Polyether polyamines and/or polyols selected from the group of polyether polyols, polyester polyols or mixtures thereof can accordingly be used, for example. The molecular weights referred to are determined via the OH number.

The polyols which are preferably used are polyetherols and/or polyesterols having number-average molecular weights between 300 and 12 000 g/mol, preferably in the range from 350 to 6000 g/mol and especially in the range from 400 to less than 4000 g/mol, and preferably an average functionality of 2 to 6, preferably 2 to 4.

Useful polyetherols for the present invention are obtainable in a known manner. For example, they can be prepared by anionic polymerization with alkali metal hydroxides, for example sodium hydroxide or potassium hydroxide, or alkali metal alkoxides, for example sodium methoxide, sodium ethoxide, potassium ethoxide or potassium isopropoxide, as catalysts and in the presence of at least one starter molecule having 2 to 8, preferably 2 to 6, reactive hydrogen atoms, or by cationic polymerization with Lewis acids, such as antimony pentachloride, boron fluoride etherate, etc., or fuller's earth as catalysts. Polyether polyols can also be prepared by double metal cyanide catalysis from one or more alkylene oxides having 2 to 4 carbon atoms in the alkylene moiety. Tertiary amines can also be used as catalyst, examples being triethylamine, tributylamine, trimethylamine, dimethylethanolamine, imidazole or dimethylcyclohexylamine. For specialty applications, monofunctional starters can also be included in the polyether construction.

Suitable alkylene oxides are, for example, tetrahydrofuran, 1,3-propylene oxide, 1,2-butylene oxide, 2,3-butylene oxide, styrene oxide and, preferably, ethylene oxide and 1,2-propylene oxide. Alkylene oxides can be used singly, alternatingly in succession or as mixtures.

Useful starter molecules include for example: water, aliphatic and aromatic, optionally N-monoalkyl-, N,N- and N,N'-dialkyl-substituted diamines having 1 to 4 carbon atoms in the alkyl moiety, such as optionally mono- and dialkyl-substituted ethylenediamine, diethylenetriamine, triethylenetetramine, 1,3-propylenediamine, 1,3-butylenediamine, 1,4-butylenediamine, 1,2-hexamethylenediamine, 1,3-hexamethylenediamine, 1,4-hexamethylenediamine, 1,5-hexamethylenediamine, 1,6-hexamethylenediamine, phenylenediamine, 2,3-, 2,4- and 2,6-tolylenediamine (TDA) and 4,4'-, 2,4'- and 2,2'-diaminodiphenylmethane (MDA) and polymeric MDA. Useful starter molecules further include: alkanolamines, for example ethanolamine, N-methyl- and N-ethylethanolamine, dialkanolamines, for example diethanolamine, N-methyl- and N-ethyldiethanolamine, trialkanolamines, for example triethanolamine, and ammonia. Preference is given to using polyhydric alcohols, such as ethanediol, 1,2-propanediol, 2,3-propanediol, diethylene glycol, dipropylene glycol, 1,4-butanediol, 1,6-hexanediol, glycerol, trimethylolpropane; pentaerythritol, sorbitol and sucrose, and mixtures thereof. Polyether polyols can be used singly or in the form of mixtures.

Polyesterols are, for example, prepared from alkanedicarboxylic acids and polyhydric alcohols, polythioether polyols, polyester amides, hydroxyl-containing polyacetals and/or hydroxyl-containing aliphatic polycarbonates, preferably in the presence of an esterification catalyst. Further possible polyols are given in "Kunststoffhandbuch, Band 7, Polyurethane", Carl Hanser Verlag, 3rd edition, 1993, chapter 3.1 for example.

The preferably used polyesterols are obtainable, for example, from dicarboxylic acids having 2 to 12 carbon atoms, preferably 4 to 6 carbon atoms, and polyhydric alcohols. Useful dicarboxylic acids include for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. Dicarboxylic acids can be used singly or as mixtures, for example in the form of a succinic, glutaric and adipic acid mixture. To prepare the polyesterols it can at times be advantageous to use the dicarboxylic acids in the form of their corresponding derivatives, such as dicarboxylic esters having 1 to 4 carbon atoms in the alcohol moiety, dicarboxylic anhydrides or dicarbonyl chlorides. Examples of polyhydric alcohols are glycols having 2 to 10, preferably 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol, triols having 3 to 6 carbon atoms, for example glycerol and trimethylolpropane and, as higher-functionality alcohol, pentaerythritol. Depending on the desired properties, polyhydric alcohols can be used alone or optionally in mixtures with each other.

The polymeric compounds having two or more isocyanate-reactive hydrogen atoms (b) preferably comprise polyols and these more preferably consist of polyetherols. And polyetherol is preferably used in the form of di- to tetrafunctional polyoxyalkylene oxide polyol having a hydroxyl number of 20 to 1000, preferably 100 to 900 and more preferably 300 to 450. Average functionality is preferably in the range from 2.5 to 3.5. The preferably used polyether polyol preferably has a secondary hydroxyl group content of greater than 70%, based on the overall number of hydroxyl groups in the polyalkylene oxide polyol. And the polyoxyalkylene oxide polyol preferably comprises not less than 50 wt % and more preferably not less than 80 wt % of propylene oxide, based on the alkylene oxide content of the polyalkylene oxide polyol.

Crosslinking and/or chain-extending agents c) can be used in the form of substances having a molecular weight of preferably below 300 g/mol and more preferably in the range from 60 to 250 g/mol, in which case chain extenders have two isocyanate-reactive hydrogen atoms and crosslinkers have 3 isocyanate-reactive hydrogen atoms. These can be used singly or preferably in the form of mixtures. Preference is given to using diols and/or triols having molecular weights less than 300, more preferably in the range from 60 to 250 and even more preferably in the range from 60 to 200. Possibilities include, for example, aliphatic, cycloaliphatic and/or araliphatic diols having 2 to 14, preferably 2 to 10, carbon atoms, such as ethylene glycol, 1,3-propanediol, 1,4-butanediol, 1,6-hexanediol, 1,10-decanediol and bis(2-hydroxyethyl)hydroquinone, 1,2-dihydroxycyclohexane, 1,3-dihydroxycyclohexane, 1,4-dihydroxycyclohexane, diethylene glycol, dipropylene glycol, tripropylene glycol, triols, such as 1,2,4-trihydroxycyclohexane, 1,3,5-trihydroxycyclohexane, glycerol and trimethylolpropane, and low molecular weight hydroxyl-containing polyalkylene oxides based on ethylene and/or 1,2-propylene oxide and the aforementioned diols and/or triols as starter molecules. Crosslinkers (c) are more preferably used in the form of low molecular weight hydroxyl containing polyalkylene oxides based on ethylene and/or 1,2-propylene oxide, even more preferably ethylene and trifunctional starters, especially glycerol.

The proportion of the overall weight of components b) to f) which is attributable to crosslinking and/or chain-extending agents c), if used, is preferably in the range from 1 to 60 wt %, more preferably in the range from 3 to 40 wt % and most preferably in the range from 4 to 15 wt %. Preferably, no chain extender is used.

Carboxylic acids (d) having a functionality of not less than 2 can be used in the form of any desired aromatic, aliphatic or cycloaliphatic carboxylic acids having two or more carboxyl groups. The number of carboxyl groups is preferably exactly 2. And the carboxylic acids may herein also be partly or wholly in the form of their salts or anhydrides. The carboxylic acids of the present invention preferably have 3 to 30 carbon atoms. And the carboxyl groups are preferably attached to aliphatic carbon atoms. It is particularly preferable for the carboxylic acids with a functionality of not less than 2 to be purely aliphatic. Linear aliphatic dicarboxylic acids having 2 to 30 carbon atoms, preferably 3 to 9 carbon atoms and especially 5, 7 or 9 carbon atoms are used in particular. In one particularly preferred embodiment, the carboxylic acids have no functional groups aside from the COOH group. And carboxylic acids (d) preferably have a melting temperature of less than 200° C., more preferably less than 150° C. and most preferably less than 120° C., in pure form.

In a further embodiment, carboxylic acids having a functionality of not less than 2 can also be used in the form of the polyesters described under (b) provided these were prepared using excess acid component, so they have at least two, preferably exactly two, carboxyl end groups. These will hereinafter be referred to as polyesterdicarboxylic acids.

The weight ratio of components (b) and (d) is preferably in the range from 1:10 to 10:1, more preferably in the range from 5:1 to 1:5 and most preferably in the range from 3:1 to 1:1.

In a further preferred embodiment, the carboxylic acid having a functionality of not less than 2 is in the form of a solution in a solvent. This solvent can be in the form of one or more of the substances described under (b). An ionic liquid can also serve as solvent in addition to the substances described under (b). Ionic liquids of this type are known and described in EP 1984438 for example. Particular preference here is given to ionic liquids wherein the cation used for the ionic liquid is selected from the group consisting of imidazolium derivatives, guanidinium derivatives and pyrazolium derivatives. In a particularly preferred embodiment, the ionic liquid is selected from the group consisting of 1-ethyl-3-methylimidazolium methosulfate, 1-ethyl-3-methylimidazolium dicyanamide, 1-ethyl-3-methylimidazolium ethosulfate, 1-ethyl-3-methylimidazolium thiocyanate, 1-ethyl-3-methylimidazolium tetrafluoroborate, 1-ethyl-3-methylimidazolium hexafluorophosphate, 1-ethyl-3-methylimidazolium diethylphosphate, 1-ethyl-3-methylimidazolium bromide, 1-ethyl-3-methylimidazolium p-toluenesulfonate, 1-butyl-3-methylimidazolium methanesulfonate, 1-butyl-3-methylimidazolium dicyanamide, 1-butyl-3-methylimidazolium ethosulfate, 1-butyl-3-methylimidazolium thiocyanate, 1-butyl-3-methylimidazolium dimethyl phosphate, 1-butyl-3-methylimidazolium bromide, 1-butyl-3-methylimidazolium p-toluenesulfonate, 1-butyl-3-methylimidazolium tetrafluoroborate and 1-butyl-3-methylimidazolium hexafluorophosphate and also mixtures of two or more ionic liquids therefrom. And a mixture of one or more polyols of component (b), optionally chain extenders and one or more ionic liquids can also serve as a solvent for carboxylic acid (d).

In the process of the present invention, the reaction of a carboxylic acid group with an isocyanate group results in the formation of a mixed carboxylic anhydride which detaches carbon dioxide to form an amide. The carbon dioxide thus formed causes the reaction mixture to foam up, so customary blowing agents, such as low-boiling liquids or chemical blowing agents, such as water, can be dispensed with. It is important here for the coordination of the timing of the chain propagation reaction in the reaction mixture and the timing of the detachment of carbon dioxide to be such as to produce a high-quality foam. If, for example, the $CO_2$ detachment ends when the molecular weight of the polymer chains is still insufficient, the foam will collapse again; if, by contrast, the chain propagation reaction has gone too far, it is no longer possible to achieve uniform foaming. This is adjusted via catalyst component (e).

Components (a) to (0 preferably comprise no physical blowing agent, based on the overall weight of components (a) to (f). And components (b) to (f) preferably comprise less than 1 wt % of water, even more preferably less than 0.5 wt % of water and most preferably less than 0.2 wt % of water. Physical blowing agents in the context of this invention are substances which vaporize under the conditions of polyurethane formation. Examples include hydrocarbons, halogenated hydrocarbons and other compounds, for example perfluorinated alkanes, such as perfluorohexane, hydrochlorofluorocarbons, and ethers, esters, ketones and/or acetals, for example (cyclo)aliphatic hydrocarbons of 4 to 8 carbon atoms, or hydrofluorocarbons, such as Solkane® 365 mfc from Solvay Fluorides LLC.

Catalysts (e) can be used in the form of catalysts customarily used in polyurethane chemistry. These are compounds which hasten the reaction between the reactive hydrogen atoms, especially of polymeric compound (b), with organic polyisocyanates (a). Possibilities include organometallic compounds, preferably organotin compounds, such as tin(II) salts of organic carboxylic acids, for example tin(II) acetate, tin(II) octoate, tin(II) ethylhexanoate, tin(II) laurate and the dialkyltin(IV) salts of organic carboxylic acids, for example dibutyltin diacetate, dibutyltin dilaurate, dibutyltin maleate, dioctyltin diacetate, and also tertiary amines such as triethylamine, tributylamine, dimethylcyclohexylamine, dimethylbenzylamine, N-methylimidazole, N-methyl-morpholine, N-ethylmorpholine, N-cyclohexylmorpholine, N,N,N',N'-tetramethylethylenediamine, N,N,N',N'-tetramethylbutylenediamine, N,N,N',N'-tetramethyl-1,6-hexylenediamin, pentamethyl-diethylenetriamine, tetramethyldiaminoethyl ether, bis(dimethylaminopropyl)urea, dimethyl-piperazine, 1,2-dimethylimidazole, 1-azabicyclo[3.3.0]octane, 1,4-diazabicyclo[2.2.2]octane, and alkanolamine compounds such as triethanolamine, trisisopropanolamine, N-methyldiethanol-amine, N-ethyldiethanolamine and dimethylethanolamine. Useful catalysts further include: tris(dialkylamino)-s-hexahydrotriazines, especially tris(N,N-dimethylamino)-s-hexahydrotriazine, tetraalkylammonium salts such as, for example, N,N,N-trimethyl-N-(2-hydroxypropyl) formate, N,N,N-trimethyl-N-(2-hydroxypropyl) 2-ethylhexanoate, tetraalkylammonium hydroxides such as tetramethylammonium hydroxide, alkali metal hydroxides such as sodium hydroxide, alkali metal alkoxides such as sodium methoxide and potassium isopropoxide, and also alkali or alkaline earth metal salts of fatty acids having 1 to 20 carbon atoms with or without pendant OH groups.

Examples useful as catalyst e) include isocyanate-reactive tertiary amines such as, for example, N,N-dimethylaminopropylamine, bis(dimethylaminopropyl)amine, N,N-dimethylaminopropyl-N'-methylethanolamine, dimethylaminoethoxyethanol, bis(dimethylaminopropyl)amino-2-propanol, N,N-dimethylaminopropyldipropanolamine, N,N,N'-trimethyl-N'-hydroxyethylbisaminoethyl ether, N,N-dimethylaminopropylurea, N-(2-hydroxypropyl)imidazole, N-(2-hydroxyethyl)imidazole, N-(2-aminopropyl)imidazole and/or the reaction products described in EP-A 0 629 607 which are formed from ethyl acetoacetate, polyether polyols and 1-(dimethylamino)-3-aminopropane.

Catalysts (e) comprise a Lewis base component. A Lewis base component is a compound which is capable of providing free pairs of electrons. The free pair of electrons is preferably on an organic compound, but it can also be attached to a metal or an organometallic compound. Here, the Lewis base component consists of one or more compounds having a delocalized system of π-electrons and selected from the group consisting of N-methylimidazole, melamine, guanidine, cyanuric acid, dicyanamide and derivatives thereof. The Lewis base component comprises N-methylimidazole or its derivatives in particular. Optionally, the Lewis base component can also be in the form of a salt of one of the carboxylic acids recited under (d). The proportion of the Lewis base component, based on the overall weight of components (a) to (f), is preferably in the range from 0.01 to 2 wt %, more preferably in the range from 0.02 to 1 wt % and most preferably in the range from 0.05 to 0.5 wt %. In a particularly preferred embodiment of the present invention no further catalysts are used in addition to the Lewis base component.

Preferably, catalysts (e) comprise no phosphorus compounds.

Auxiliaries and additives (f) can be used in the form of foam stabilizers, cell openers, surfactants, reaction retardants, stabilizers against aging and weathering effects, plasticizers, flame retardants, fungistats, bacteriostats, pigments and dyes and also the customary organic and nonorganic fillers known per se.

Foam stabilizers used are preferably silicone-based foam stabilizers. It is further possible to use siloxane-polyoxyalkylene copolymers, organopolysiloxanes, ethoxylated fatty alcohols and alkylphenols and esters of castor oil/ricinoleic acid as foam stabilizers.

Useful cell openers include, for example, paraffins, polybutadienes, fatty alcohols and dimethylpolysiloxanes.

Antioxidants are mostly used as stabilizers against aging and weathering effects. They can be, for example, sterically hindered phenols, hindered amine light stabilizers (HALS), triazines, benzophenones and benzotrioles.

Useful surfactants include, for example, compounds which serve to augment the homogenization of the starting materials and ensure prolonged phase stability of the polyol component. These may in some cases also be suitable for regulating the cell structure. Examples which may be mentioned are emulsifiers, such as the sodium salts of castor oil sulfates, or of fatty acids and also salts of fatty acids with amines, for example the salt of oleic acid with diethylamine, the salt of stearic acid with diethanolamine, the salt of ricinoleic acid with diethanolamine, salts of sulfonic acids, for example alkali metal or ammonium salts of dodecylbenzene- or dinaphthylmethanedisulfonic acid and ricinoleic acid; foam stabilizers, such as siloxane-oxyalkylene copolymers and other organopolysiloxanes, ethoxylated alkylphenols, ethoxylated fatty alcohols, paraffin oils, castor oil esters, ricinoleic esters, Turkey red oil and peanut oil and cell regulators, such as paraffins, fatty alcohols and dimethylpolysiloxanes. Oligomeric polyacrylates having polyoxyalkylene and fluoroalkane moieties as side groups are further useful for improving the emulsification effect, the cell structure and/or the stabilization of the foam.

Surfactants are typically used in amounts of 0.01 to 5 wt %, based on the overall weight of polyhydroxy compounds b).

Useful flame retardants include, for example, tricresyl phosphate, tris(2-chloroethyl) phosphate, tris(2-chlorpropyl) phosphate, tris(1,3-dichlorpropyl) phosphate, tris(2,3-dibrompropyl) phosphate and tetrakis(2-chloroethyl)ethylene diphosphate. In addition to the halogen-substituted phosphates already mentioned, it is also possible to use inorganic flame retardants, such as red phosphorus, aluminum oxide hydrate, antimony trioxide, arsenic oxide, ammonium polyphosphate, expandable graphite and calcium sulfate or cyanuric acid derivatives, for example melamine, or mixtures of two or more flame retardants, for example ammonium polyphosphates and melamine and/or expandable graphite and also optionally starch to render the rigid PU foams produced according to the present invention flame resistant.

The flame retardants preferably comprise expandable graphite and oligomeric organophosphorus flame retardant. Expandable graphite is common general knowledge. An organophosphorus flame retardant of this type is described in very general terms in U.S. Pat. No. 4,382,042. The preference here is for organophosphorus flame retardants without halogen atoms.

The oligomeric organophosphorus flame retardant preferably comprises a phosphorus content of not less than 5 wt % and, in preferred embodiments, at least 3 phosphate ester units. Here "phosphorus ester units" comprise phosphate ester units and phosphonate ester units. Hence the oligomeric organophosphorus flame retardants of the present invention comprise structures with purely phosphonate units, with purely phosphate units and with both phosphonate and phosphate units.

Flame retardant combinations of expandable graphite and oligomeric organophosphorus flame retardant and their use in polyurethane foams are known and described in the European patent application of application number EP 12150081.3, which is hereby incorporated herein by reference.

Fillers, especially reinforcing fillers, can be added in the form of the customary organic and inorganic fillers, reinforcing agents and weighting agents known per se. Specific examples are: inorganic fillers such as, for example, siliceous minerals, for example sheet-silicates such as antigorite, serpentine, hornblendes, amphiboles, chrysotile, zeolites, talcum; metal oxides, for example kaolin, aluminas, aluminum silicate, titanium oxides and iron oxides, metal salts such as, for example, chalk, barite and inorganic pigments, such as cadmium sulfide, zinc sulfide and also glass particles. Useful organic fillers include for example:

carbon black, melamine, rosin, cyclopentadienyl resins and polymer-modified polyoxyalkylene polyols.

More particular information regarding the use of the abovementioned auxiliary and addition agents and their modes of action and also further examples are given, for example, in "Kunststoffhandbuch, Band 7, Polyurethane", Carl Hanser Verlag, 3rd edition 1993, chapter 3.4.

Organic polyisocyanates (a), polymeric compounds having two or more isocyanate-reactive hydrogen atoms (b), optionally crosslinking and/or chain-extending agents (c), carboxylic acids having a functionality of 2 or more (d), catalysts comprising a Lewis base component (e) and optionally auxiliaries and additives (f) are preferably reacted in such amounts that the isocyanate index is in the range from 80 to 150, preferably 95-130 and more preferably 98-118.

The isocyanate index in the context of the present invention is the stoichiometric ratio of isocyanate groups to isocyanate-reactive groups, multiplied by 100. Isocyanate-reactive groups include all groups in the reaction mixture (including chemical blowing agents) which are reactive with isocyanate, but not the isocyanate group itself.

The rigid polyurethane-polyamide foams are preferably produced by the one-shot process in the form of large slabs of foam, either continuously in slabstock foaming systems or batchwise in open foam molds. When a mixing chamber having two or more feed nozzles is used, the starting components can be introduced individually and intensively mixed in the mixing chamber. It will prove particularly advantageous to operate according to the 2-component process and to use as a component A a mixture of the polymeric compounds having two or more isocyanate-reactive hydrogen atoms (b), optionally crosslinking and/or chain-extending agents (c), at least difunctional carboxylic acids (d), catalysts comprising a Lewis base component (e) and optionally auxiliaries and additives (f) and as a component B the organic, optionally modified polyisocyanates (a). Preferably, a mixture comprising components (b) and (d) and also optionally components (c), (e) and (f) is prepared and heated, preferably to a temperature of 60 to 150° C., more preferably to a temperature of 80 to 130° C. and most preferably to a temperature of 100 to 120° C. At this temperature, the mixture is stirred, preferably for not less than one hour, more preferably for 1 to 24 hours and most preferably for 6 to 8 hours, to obtain a homogeneous liquid mixture. The mixture can then be cooled down to room temperature until the time has come for processing. Since said components (A) and (B) are very stable in storage, they are simple to transport in this form and need only be intensively mixed in the appropriate amounts before processing. The mixing of components (A) and (B) or of construction components a) to f) can be performed using high-pressure or low-pressure processing equipment.

The rigid polyurethane-polyamide foams are produced by mixing the described starting materials, conveniently in the form of components A and B, at temperatures of approximately 15 to 60° C., preferably 20 to 40° C., and then allowing the reaction mixture to foam up in open, optionally temperature-regulated molds or in continuous-process slabstock foaming systems. In the context of the present invention, the mixture of components a) to f) is referred to as the reaction mixture when reaction conversions are below 90%, based on the isocyanate groups.

The rigid polyurethane-polyamide foam slabs obtained can, if necessary, be cut into foam slabs dimensioned in accordance with the shaped articles to be produced and these slabs split into rigid PU foam sheets from 4 to 50 mm, preferably from 6 to 30 mm and especially from 6 to 20 mm in thickness. Any industrially customary splitting device is suitable for this purpose, although the preference in practice is for the use of horizontal splitting systems involving the use of circulating band blades.

The thermoformable rigid PU foam sheets obtained can be coated on one or more sides with adhesives, for example moisture-curing adhesives based on isocyanate or thermoplastic hot-melt adhesives, and then be laminated with reinforcing, covering and/or decorative materials.

Customary processes can be used to form the sandwich elements, for example molding and curing in a heated mold.

The products obtained combine hardness and flexural strength with very good resistance to hydrolysis. Surprisingly, the thermoformable rigid polyurethane-polyamides foams of the present invention have a low glass transition temperature, especially by comparison with known thermoformable rigid polyurethane foams, and hence are thermoformable at low mold temperatures especially in the production of vehicle lining, such as roof liners, it is thus possible to lower the mold temperature, leading to energy savings. The glass transition temperature $T_g$ of rigid polyurethane-polyamide foams according to the present invention is preferably below 120° C., more preferably in the range from 70° C. to below 110° C. and most preferably in the range from 75 to below 100° C. Rigid polyurethane-polyamide foams of this type also have a high permeability to air and hence a high sound-damping performance coupled with outstanding mechanical properties, such as stiffness and resilience, high thermal stability to degradation, and also a simplified manufacture on account of the lower reaction temperature. It is further advantageous that the exotherm of the foaming reaction is smaller than with the use of water as a blowing agent and hence no disadvantages due to substantial evolution of heat, such as core scorching, arise in the production of foam slabs, which from experience also leads to lower evolution of odor.

The thermoformable rigid polyurethane-polyamide foams of the present invention are preferably used for exterior lining or engine compartment lining of motor vehicles.

The examples which follow illustrate the invention:

The following substances were used:

Polyol A: polyether polyol having an average OH number of 400 mg KOH/g, a functionality of 3 and a propylene oxide content, based on the overall weight of the polyether, of 78 wt %.

Polyol B: polyether polyol having an average OH number of 800 mg KOH/g, a functionality of 3 and a propylene oxide content, based on the overall weight of the polyether, of 55 wt %.

Polyol C: polyether polyol having an average OH number of 28 mg KOH/g, a functionality of 2.7 and a propylene oxide content, based on the overall weight of the polyether, of 84 wt %.

Polyol D: polyether polyol having an average OH number of 570 mg KOH/g, a functionality of 3 and a propylene oxide content, based on the overall weight of the polyether, of 70 wt %.

Polyol E: polyether polyol having an average OH number of 160 mg KOH/g, a functionality of 3 and a propylene oxide content, based on the overall weight of the polyether, of 87 wt %.

Polyol F: polyether polyol having an average OH number of 30 mg KOH/g, a functionality of 2.2 and a propylene oxide content, based on the overall weight of the polyether, of 93 wt %.

Polyol G: polyether polyol having an average OH number of 250 mg KOH/g, a functionality of 2 and a propylene oxide content, based on the overall weight of the polyether, of 83 wt %.
KV A: chain extender A; diol having an average OH number of 1250 mg KOH/g
KV B: chain extender B; diol having an average OH number of 949 mg KOH/g
Crosslinker A: glycerol
Diacid A: glutaric acid
Diacid B: azelaic acid
Cat A: 1-methylimidazole
Cat B: triethylenediamine (Dabco® 33LV, Air Products GmbH)
Cat C: bis(2-dimethylaminoethyl)ether dissolved in 30 wt % dipropylene glycol (GE Silicones)
Stabilizer A: DABCO® 5604 silicone-based surfactant from Air Products.
Stabilizer B: Tegostab® 88473 silicone-based surfactant from Evonik.
Stabilizer C: Tegostab® 88476 silicone-based surfactant from Evonik.
Iso A: polymethylenediphenyl diisocyanate having an NCO content of 31.5 wt % and an average functionality of 2.7
Iso B: mixture of diphenylmethane diisocyanate and the corresponding carbodiimide having an NCO content of 29.5 wt % and an average functionality of 2.2
Iso C: diphenylmethane diisocyanate having an NCO content of 33.5 wt % and a functionality of 2

Preparing a Mixture of Diacid and Polyol(s):

The polyols, diacids and, if used, crosslinkers and chain extenders relating to the tests as per table 1 were mixed and stirred at a temperature of 100 to 120° C. for 12 hours. The mixture was subsequently cooled down to room temperature with stirring and, if used, catalysts B and C were added. This mixture can be stored at room temperature for several days without phase separation. Table 1 reports the ingredients in parts by weight.

Producing the Thermoformable Foam:

Catalyst A and, if used, the silicone stabilizer were added to the mixture obtained and stirred at room temperature for 10 seconds. The isocyanates were then added and the mixture was vigorously stirred for a further 15 seconds. The mixture was then introduced into a cardboard box. The resultant foam structure was visually inspected. To determine their air permeability, the foams obtained were cut horizontally into slices 12 mm in thickness. Air permeability was determined by the method described hereinbelow.

| | Example 1 | Example 2 | Example 3 | Example 4 | Comparator 1 | Comparator 2 |
|---|---|---|---|---|---|---|
| Polyol A | 69.1 | 69.1 | 57.6 | 62.4 | | 69.3 |
| Polyol B | | | 16.6 | | | |
| Polyol C | | | | | 4.5 | |
| Polyol D | | | | | 41.0 | |
| Polyol E | | | | | 9.5 | |
| Polyol F | | | | | 24.2 | |
| glycerol | | | | | 2.3 | |
| Polyol G | | | | | 5.3 | |
| KV A | | | | | 7.7 | |
| KV B | | | | | | 23.0 |
| Diacid A | 29.2 | 29.2 | 24.3 | | | |
| Diacid B | | | | 37.5 | | |
| Water | | | | | 4.2 | 6.0 |
| Cat A | 0.2 | 0.2 | 0.2 | 0.1 | | 0.2 |
| Cat B | | | | | 0.4 | |
| Cat C | | | | | 0.1 | |
| Stabilizer A | 1.5 | 1.5 | 1.3 | | | 1.5 |
| Stabilizer B | | | | | 0.7 | |
| Stabilizer C | | | | | 0.1 | |
| Iso A | 80.0 | 60.0 | 80.0 | 60.0 | 60 | 80.0 |
| Iso B | 20.0 | | 20.0 | | | 20.0 |
| Iso C | | 40.0 | | 40.0 | 40 | |
| cream (min:sec) | 00:45 | 00:45 | 00:45 | 00:20 | 1:05 | 01:10 |
| gel (min:sec) | 02:20 | 2:20 | 02:10 | 01:10 | 02:40 | 02:25 |
| full-rise time (min:sec) | 03:20 | 3:20 | 03:15 | 02:20 | 04:00 | 03:30 |
| density (g/l) | 28 | 29 | 28 | 30 | 32 | 29 |
| cell structure | fine | fine | fine | fine | fine | fine |
| back pressure (bar) | 5 | 10 | 10 | 20 | >250 | >250 |
| open-cell content (%) | 90 | 70 | 70 | 70 | 25 | 21 |
| DIN ISO 4590 flexural strength (kPa) DIN 53423 | 225 | 190 | 174 | 124 | 226 | 222 |
| modulus of elasticity (kPa) DIN 53423 | 3500 | 2600 | 1600 | 1300 | 2300 | 2400 |
| Tg (° C.) ASTM D7028 | 89 | 87 | 90 | 93 | 145 | 143 |
| degradation temperature by TGA (° C.) | 308 | 308 | 300 | 308 | 300 | 300 |

Measurement of Air Permeability:

A sheet measuring 200 mm×200 mm×12 mm (length×width×height), band-sawed from the slabs described above, is laid onto an air-permeable support. A downwardly open pressure pad equipped with a manometer and a flow meter is placed in the center of the sheet. The pressure pad is clamped onto the sheet so as to prevent a gap forming between the pad and the sheet. The compressed air flow rate is set to 2 l/min and the resultant back pressure in bar is read off the manometer.

Determination of Degradation Temperature by Thermogravimetric Analysis (TGA):

A dried sample of the foam produced (about 5-7 mg) is heated from room temperature to 500° C. at a rate of 20° C./min on a microbalance in dry synthetic air. Weight loss is recorded as a function of time. The temperature at which the sample has lost 10% of its original weight is referred to as the degradation temperature.

We claim:

1. A process for producing a thermoformable rigid polyurethane-polyamide foam, comprising:
   mixing
   a) an organic polyisocyanate with
   b) at least one polymeric compound having two or more isocyanate-reactive hydrogen atoms,
   c) optionally a crosslinking agent, a chain-extending agent, or both,
   d) at least one carboxylic acid having a functionality of two or more,
   e) a catalyst comprising at least one Lewis base component selected from the group consisting of N-methylimidazole, melamine, guanidine, cyanuric acid and dicyandiamide, or a derivative of the Lewis base component, and
   f) optionally an auxiliary or an additive to form a reaction mixture, and reacting the reaction mixture to form the rigid polyurethane-polyamide foam, wherein the reaction mixture comprises no physical blowing agent and less than 1 wt % of water, based on the overall weight of components (a) to (f), the at least one carboxylic acid (d) is in a form selected from the group consisting of a carboxylic acid, a carboxylate salt, an acid anhydride and an ionic liquid, a closed-cell content of the rigid polyurethane-polyamide foam is less than 70%, and a density of the rigid polyurethane-polyamide foam is from 50 to 80 g/L.

2. The process according to claim 1, wherein the at least one carboxylic acid (d) is an aliphatic dicarboxylic acid of 2 to 30 carbon atoms.

3. The process according to claim 1, wherein a melting point of the at least one carboxylic acid (d) in pure form is below 200° C.

4. The process according to claim 2, wherein the at least one carboxylic acid (d) is a linear aliphatic dicarboxylic acid having 4 to 9 carbon atoms.

5. The process according to claim 1, wherein the at least one carboxylic acid (d) is a polyesterdicarboxylic acid.

6. The process according to claim 1, wherein the at least one carboxylic acid (d) is an ion of an ionic liquid.

7. The process according to claim 1, wherein the at least one carboxylic acid (d) is a carboxylic anhydride or a carboxylate salt.

8. The process according to claim 1, wherein the at least one carboxylic acid (d) is in a form of a solution in the polymeric compound (b).

9. The process according to claim 1, wherein the polymeric compound (b) comprises a polyether polyol having a polypropylene oxide content of not less than 50 wt %, based on an alkylene oxide content of a polyalkylene oxide polyol.

10. The process according to claim 1, performed such that a component A is mixed with a component B to form the reaction mixture, wherein the component A comprises a mixture of the polymeric compound having two or more isocyanate-reactive hydrogen atoms (b), optionally the crosslinking agent, chain-extending agent, or both (c), the carboxylic acid (d), the catalyst (e) and optionally the auxiliary or additive (f), and the component B comprises the organic polyisocyanate (a).

11. The process according to claim 3, wherein the at least one carboxylic acid (d) is a linear aliphatic dicarboxylic acid of 4 to 9 carbon atoms.

12. The process according to claim 2, wherein the at least one carboxylic acid (d) is an ion of an ionic liquid.

13. The process according to claim 3, wherein the at least one carboxylic acid (d) is an ion of an ionic liquid.

14. The process according to claim 4, wherein the at least one carboxylic acid (d) is an ion of an ionic liquid.

15. The process according to claim 11, wherein the at least one carboxylic acid (d) is an ion of an ionic liquid.

16. The process according to claim 1, wherein the crosslinking agent is present in the mixing.

17. The process according to claim 1, wherein the chain-extending agent is present in the mixing.

18. The process according to claim 1, wherein the auxiliary or the additive is present in the mixing.

* * * * *